(12) United States Patent
Steiner et al.

(10) Patent No.: US 11,411,417 B2
(45) Date of Patent: Aug. 9, 2022

(54) RECHARGEABLE BATTERY KIOSK FOR LIGHT ELECTRIC VEHICLES

(71) Applicant: NEUTRON HOLDINGS, INC., San Francisco, CA (US)

(72) Inventors: Michael Steiner, San Francisco, CA (US); David Krawczyk, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 121 days.

(21) Appl. No.: 17/061,274

(22) Filed: Oct. 1, 2020

(65) Prior Publication Data

US 2021/0021140 A1    Jan. 21, 2021

Related U.S. Application Data

(63) Continuation of application No. 16/734,187, filed on Jan. 3, 2020, now Pat. No. 10,797,497.

(60) Provisional application No. 62/788,641, filed on Jan. 4, 2019.

(51) Int. Cl.
*H02J 7/00* (2006.01)

(52) U.S. Cl.
CPC ........ *H02J 7/0045* (2013.01); *H02J 7/00034* (2020.01); *H02J 7/00036* (2020.01); *H02J 7/00045* (2020.01)

(58) Field of Classification Search
None
See application file for complete search history.

(56) References Cited

U.S. PATENT DOCUMENTS

| | | |
|---|---|---|
| 8,560,147 B2 | 10/2013 | Taylor |
| 8,862,304 B2 | 10/2014 | Chen |
| 8,878,487 B2 | 11/2014 | Wu |
| 8,996,212 B2 | 3/2015 | Chen |
| 9,124,085 B2 | 9/2015 | Wu |
| 9,129,461 B2 | 9/2015 | Luke |
| 9,176,680 B2 | 11/2015 | Chen |
| 9,182,244 B2 | 11/2015 | Luke |
| 9,275,505 B2 | 3/2016 | Taylor |
| 9,390,566 B2 | 7/2016 | Taylor |
| 9,407,024 B2 | 8/2016 | Wu |
| 9,424,697 B2 | 8/2016 | Wu |
| 9,552,682 B2 | 1/2017 | Luke |
| D789,883 S | 6/2017 | Luke |

(Continued)

FOREIGN PATENT DOCUMENTS

| | | |
|---|---|---|
| EP | 3342627 A1 | 7/2018 |
| WO | 2018/104965 A1 | 6/2018 |
| WO | 2018/153912 A1 | 8/2018 |

OTHER PUBLICATIONS

PCT International Search Report and Written Opinion in International Application PCT/US2020/012256, dated Apr. 17, 2020, 11 pages.

(Continued)

*Primary Examiner* — Arun C Williams
(74) *Attorney, Agent, or Firm* — Dentons US LLP

(57) ABSTRACT

This disclosure generally relates to a battery kiosk that houses and distributes rechargeable batteries for light electric vehicles. The battery kiosk includes various visual indicators that are activated based on the individual's progress with a rechargeable battery exchange process.

20 Claims, 9 Drawing Sheets

(56) References Cited

U.S. PATENT DOCUMENTS

| | | | |
|---|---|---|---|
| D806,019 S | 12/2017 | Wang | |
| 9,854,438 B2 | 12/2017 | Luke | |
| 9,908,506 B2 | 3/2018 | Taylor | |
| 9,911,252 B2 | 3/2018 | Wu | |
| D820,782 S | 6/2018 | Wang | |
| 10,040,359 B2 | 8/2018 | Chen | |
| 2003/0120380 A1* | 6/2003 | Bean | G07F 7/06 700/231 |
| 2012/0025764 A1* | 2/2012 | Lee | B60L 53/305 320/109 |
| 2013/0026971 A1* | 1/2013 | Luke | B60L 50/40 320/104 |
| 2013/0033222 A1* | 2/2013 | Hixson | E04H 1/1211 320/101 |
| 2013/0063073 A1* | 3/2013 | Kawasaki | H02J 7/0027 320/101 |
| 2013/0282472 A1* | 10/2013 | Penilla | G06Q 30/0639 705/14.35 |
| 2014/0239883 A1* | 8/2014 | Hobson | H02J 7/0044 320/137 |
| 2014/0266006 A1 | 9/2014 | Luke | |
| 2014/0277844 A1 | 9/2014 | Luke | |
| 2014/0279576 A1 | 9/2014 | Luke | |
| 2015/0185040 A1 | 7/2015 | Wu | |
| 2015/0249353 A1* | 9/2015 | Hamilton, IV | H02J 7/0045 320/114 |
| 2016/0025506 A1* | 1/2016 | Penilla | G06Q 30/00 701/430 |
| 2016/0071079 A1* | 3/2016 | Aloe | H02J 7/003 705/17 |
| 2017/0039631 A1 | 2/2017 | Luke | |
| 2018/0182188 A1 | 6/2018 | Luke | |
| 2018/0263557 A1* | 9/2018 | Kahlman | H04B 5/0012 |

OTHER PUBLICATIONS

Smarter today. Smarter tomorrow. The Gogoro Network Battery Swapping Platform, https://www.gogoro.com/gogoro-network/, accessed via Internet on Apr. 7, 2020, 5 pages.

International Preliminary Report on Patentability; International application No. PCT/US2020/012256; dated Jun. 16, 2021; (5 Pages).

* cited by examiner

RECHARGEABLE BATTERY KIOSK FOR LIGHT ELECTRIC VEHICLES

CROSS-REFERENCE TO RELATED APPLICATIONS

This application is a continuation of U.S. patent application Ser. No. 16/734,187, filed on Jan. 3, 2020, now allowed, which claims priority to U.S. Provisional Application No. 62/788,641, filed on Jan. 4, 2019, all of which are hereby incorporated by reference as if fully set forth herein.

BACKGROUND

Electric vehicles (e.g., scooters, bicycles, etc.) are typically powered by a power source such as, for example, a rechargeable battery. As the electric vehicle is used, power in the rechargeable battery is consumed. When this occurs, a user of the electric vehicle may exchange the rechargeable battery with little or no remaining power with another rechargeable battery that has more power or is fully charged.

SUMMARY

Light electric vehicles (e.g., scooters, bicycles, etc.) are typically powered by a power source such as, for example, a rechargeable battery. In some examples, the rechargeable battery may be removably coupled to a light electric vehicle which enables an individual to exchange a rechargeable battery with little or no remaining power with another rechargeable battery (e.g., a rechargeable battery that has more power or is fully charged).

To exchange a rechargeable battery, the individual may be required to locate and travel to a rechargeable battery kiosk. When the individual arrives at the rechargeable battery kiosk, the individual may remove the rechargeable battery from the light electric vehicle, place the removed rechargeable battery in an available rechargeable battery slot in the rechargeable battery kiosk, select a new rechargeable battery, and secure the new rechargeable battery to the light electric vehicle.

In some examples, the rechargeable battery kiosk may require that the rechargeable battery undergo a check-in process prior to allowing the individual to take a different rechargeable battery. During the check-in process, the rechargeable battery kiosk may instruct the individual where to place the rechargeable battery and/or which rechargeable battery the individual should take. For example, the rechargeable battery kiosk may include an indicator, such as a lighting device, that illuminates which rechargeable battery slot will receive the rechargeable battery. The rechargeable battery kiosk may also indicate which rechargeable battery the individual should take (e.g., by illuminating the rechargeable battery slot associated with a battery that is fully charged or mostly fully charged).

The present disclosure also describes a method for exchanging rechargeable batteries at a rechargeable battery kiosk. According to some examples, the method includes authenticating a first rechargeable battery at a rechargeable battery kiosk. When the rechargeable battery is authenticated, the rechargeable battery is received into an available battery slot of the rechargeable battery kiosk. In response to receiving the rechargeable battery in the available battery slot, another rechargeable battery is unlocked from a different battery slot in the rechargeable battery kiosk. The rechargeable battery kiosk also activates a visual indicator associated with the different battery slot to provide a notification to an individual that the rechargeable battery is removable from the different battery slot.

The present disclosure also describes a rechargeable battery kiosk that includes at least one processing unit and a memory coupled to the at least one processing unit. The memory stores instructions that, when executed by the at least one processing unit, perform a rechargeable battery exchange process. For example, the battery kiosk receives identification information from a first rechargeable battery and uses the identification information to verify and/or authenticate the first rechargeable battery. The first rechargeable battery may then be received into an available battery slot of the battery kiosk. In response to receiving the first rechargeable battery into the available battery slot, the battery kiosk unlocks a second rechargeable battery from a different battery slot. In some examples, the battery kiosk only unlocks the second rechargeable battery when it is determined the first rechargeable battery is correctly inserted into the available battery slot. The battery kiosk also activates a visual indicator associated with the different battery slot. The visual indicator notifies the individual that she is to remove the rechargeable battery from the battery slot identified by the visual indicator.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
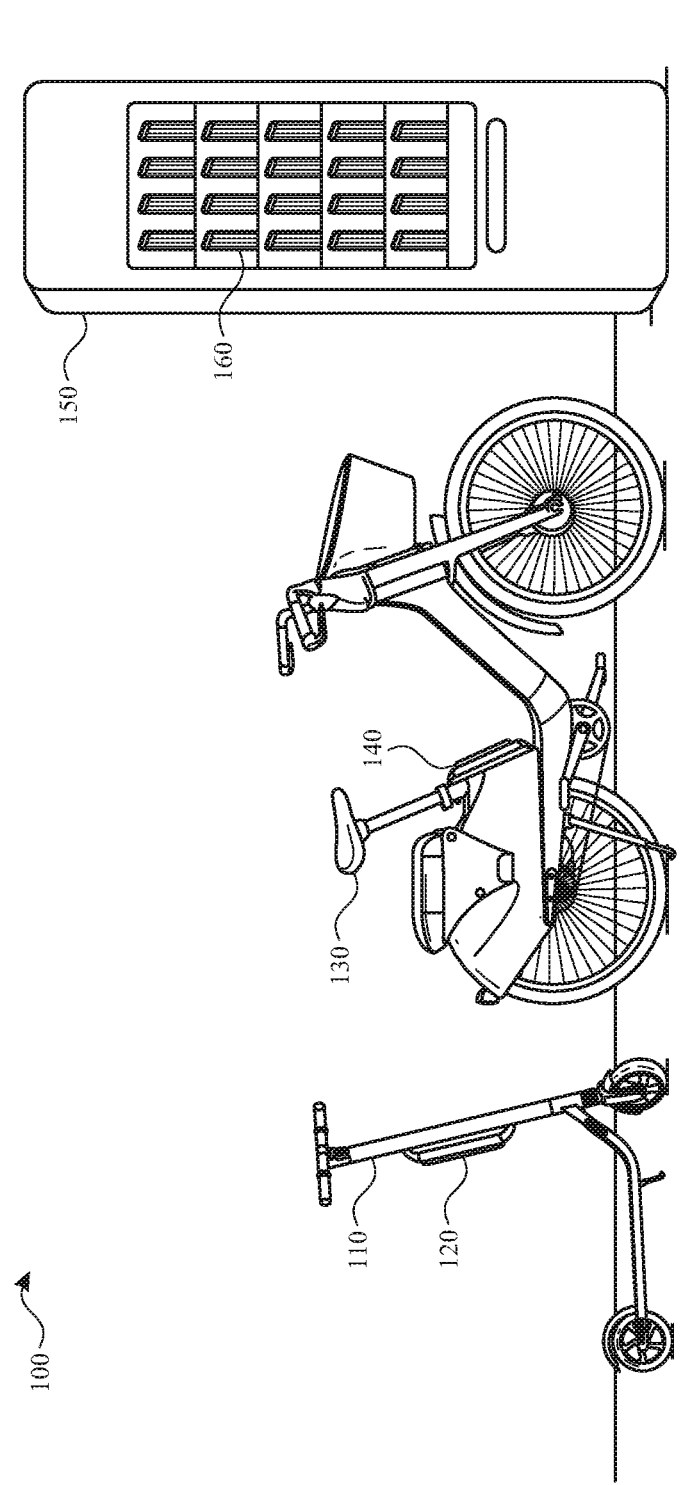
FIG. 1 illustrates an example environment in which a rechargeable battery kiosk receives and distributes rechargeable batteries for different kinds of light electric vehicles according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a rechargeable battery kiosk (e.g., a device that includes a processing unit, charging circuitry, and communication capabilities that automates the receipt and distribution of one or more rechargeable batteries) that houses and charges rechargeable batteries for light electric vehicles (e.g., scooters, bicycles, etc.). In some examples, the rechargeable battery kiosk (also referred to herein as a battery kiosk) houses the rechargeable batteries in rechargeable battery slots. The battery kiosk enables an individual that is using a light electric vehicle to exchange a rechargeable battery having little or no remaining power with one that is fully charged or substantially (e.g., 75% or more, 70% or more, etc.) fully charged.

To exchange a rechargeable battery at the battery kiosk, the individual may initiate a rechargeable battery check-in process (also referred to herein as a check-in process). In some examples, the check-in process may be initiated by an application executing on the individual's computing device or computing system (e.g., remote from the battery kiosk or the individual's computing device). In other examples, the check-in process may be initiated at the battery kiosk.

For example, when the individual arrives at a battery kiosk, she removes the rechargeable battery from the light electric vehicle and places it into, near, or on a check-in receptacle integrated with, coupled to, or otherwise associated with the battery kiosk. The check-in receptacle uses a communication protocol (e.g., near field communication (NFC), Bluetooth, radio-frequency identification (RFID), network, etc.) to authenticate or otherwise verify that the rechargeable battery can and/or should be placed into one of the rechargeable battery slots in the battery kiosk.

The check-in receptacle may include or otherwise be associated with a visual indicator that indicates that the individual should place or insert her rechargeable battery into and/or on the check-in receptacle. In some examples, the visual indicator is a lighting device (e.g., a set of light emitting diodes, bulbs, screens, etc.). For example, the lighting device, or other visual indicator, may illuminate at least a portion of the check-in receptacle, illuminate an area close to the check-in receptacle, and/or a border surrounding the check-in receptacle prior to and/or during the check-in process to notify the individual where the check-in process for the rechargeable battery can or should be initiated.

In some examples, the lighting device can be triggered (e.g., turned on or off) in a number of different ways. For example, the lighting device can be triggered: 1) in response to an individual approaching the battery kiosk; 2) in response to the individual bringing a rechargeable battery within a predetermined distance (e.g., five feet or less, ten feet or less, fifteen feet or less, etc.) of the battery kiosk; 3) when a rechargeable battery check-in process is initiated on an application executing on the individual's computing device; and/or 4) when the battery kiosk receives a signal from the individual's computing device and/or a network service that is associated with the battery kiosk. In other examples, the lighting device of the rechargeable battery kiosk may include a low energy light that is always on. The rechargeable battery kiosk may also include other lighting devices such as, for example, a marquee or other indicator, that can identify the rechargeable battery kiosk to individuals who need a rechargeable battery (e.g., riders of light electric vehicles).

During the check-in process, the battery kiosk can indicate which rechargeable battery slot will receive the rechargeable battery. For example, the battery kiosk includes a number of different rechargeable battery slots (some of which may be occupied by other rechargeable batteries and some of which may be empty), and each rechargeable battery slot may have an associated visual indicator (e.g., a lighting device(s)). Once the rechargeable battery has been authenticated and/or identified (e.g., after the individual places the rechargeable battery into and/or on the check-in receptacle), the battery kiosk may activate a visual indicator of one or more of the empty rechargeable battery slots signaling that the individual should insert the rechargeable battery into one of the identified rechargeable battery slots.

When the individual inserts the rechargeable battery into one of the identified rechargeable battery slots, the battery kiosk determines whether the rechargeable battery was inserted correctly. As used herein, the term inserted correctly or correctly inserted means that the rechargeable battery has been placed on and/or inserted into the rechargeable battery slot in an orientation, direction and/or distance required by the rechargeable battery slot (e.g., based on a shape, size and/or orientation of the rechargeable battery slot) to electrically couple the charging components and/or circuitry of the battery kiosk to the charging components and/or circuitry of the rechargeable battery (e.g., the pins of the rechargeable battery slot align and contact the pins of the rechargeable battery). In some examples, the visual indicator associated with the rechargeable battery slot may provide a notification to the individual that the rechargeable battery has been inserted correctly (e.g., by changing a color of the visual indicator from red to green).

When the battery kiosk determines the rechargeable battery was correctly inserted into the rechargeable battery slot, the battery kiosk may activate a visual indicator for one or more of the rechargeable battery slots that house a rechargeable battery. The visual indicator can provide a notification or an instruction that the individual remove the rechargeable battery from the identified rechargeable battery slot. While examples herein describe visual indicators that guide the individual through the battery exchange process, as an addition or an alternative, the battery kiosk can include one or more display screens and/or one or more speakers to output visual instructions and/or audible instructions, respectively, in a sequential similar manner as the individual progresses from the check-in process to completion of the exchange.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems include an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data (or other location information) received by the network service over the network communication channel.

The user interface of the client application displays the location information of the individual and the light electric vehicles as different icons (or other such representations). Once the location information is displayed, the individual may select an icon representing a type of light electric vehicle (e.g., an icon for an electric scooter 110 or an icon for an electric bicycle 130). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as it is used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is rented or otherwise used by an individual and may track location information at periodic intervals when the light electric vehicle has been reserved or is otherwise not is use.

The one or more computing systems of the network service also include one or more databases that store information about each of the light electric vehicles, the rechargeable batteries and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the individual. This information may include a profile of the individual (e.g., username, contact information, etc.) security credentials of the individual (e.g., a password), historical usage data, payment information and the like.

The one or more computing systems of the network service may also include a matching system. The matching system receives, manages or otherwise handles various requests from the individual. The requests may include light electric vehicle rental requests and light electric vehicle reservation requests. For example, when a vehicle rental request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual. For example, when an individual rents and uses a light electric vehicle, the individual may be charged for the usage based on a duration of use and/or a travel distance. Once the individual has finished using the light electric vehicle (e.g., by arriving at their intended destination, a check-in point, a rechargeable battery kiosk 150, etc.), the payment system may automatically process the payment information of the individual.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the individual. When this occurs, the individual may be directed to a rechargeable battery kiosk 150. For example, the network service can transmit data, over one or more networks, to the computing device to cause the computing device to display information about a particular rechargeable battery kiosk 150 to travel to.

When the individual arrives at the rechargeable battery kiosk 150, the individual may exchange the light electric vehicle's current battery with another rechargeable battery housed by the rechargeable battery kiosk 150, thereby enabling the light electric vehicle to continue or resume operation. In some instances, the individual can use the client application executing on the computing device of the individual to locate and/or select a rechargeable battery kiosk 150, receive directions to the rechargeable battery kiosk 150, and initiate a battery swap with the rechargeable battery kiosk 150 when the individual arrives at its location. In another example, the individual can initiate a battery swap at the rechargeable battery kiosk 150.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on a light electric vehicle and wants or needs to exchange the light electric vehicle's current rechargeable battery for one that has more charge, the individual may be directed (e.g., via the client application executing on the individual's computing device) to the rechargeable battery kiosk 150 associated with the geographic region. When the individual arrives at the rechargeable battery kiosk 150, the individual can exchange their current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 150 comprises a control system that communicates directly or indirectly with a computing device of the individual when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2:
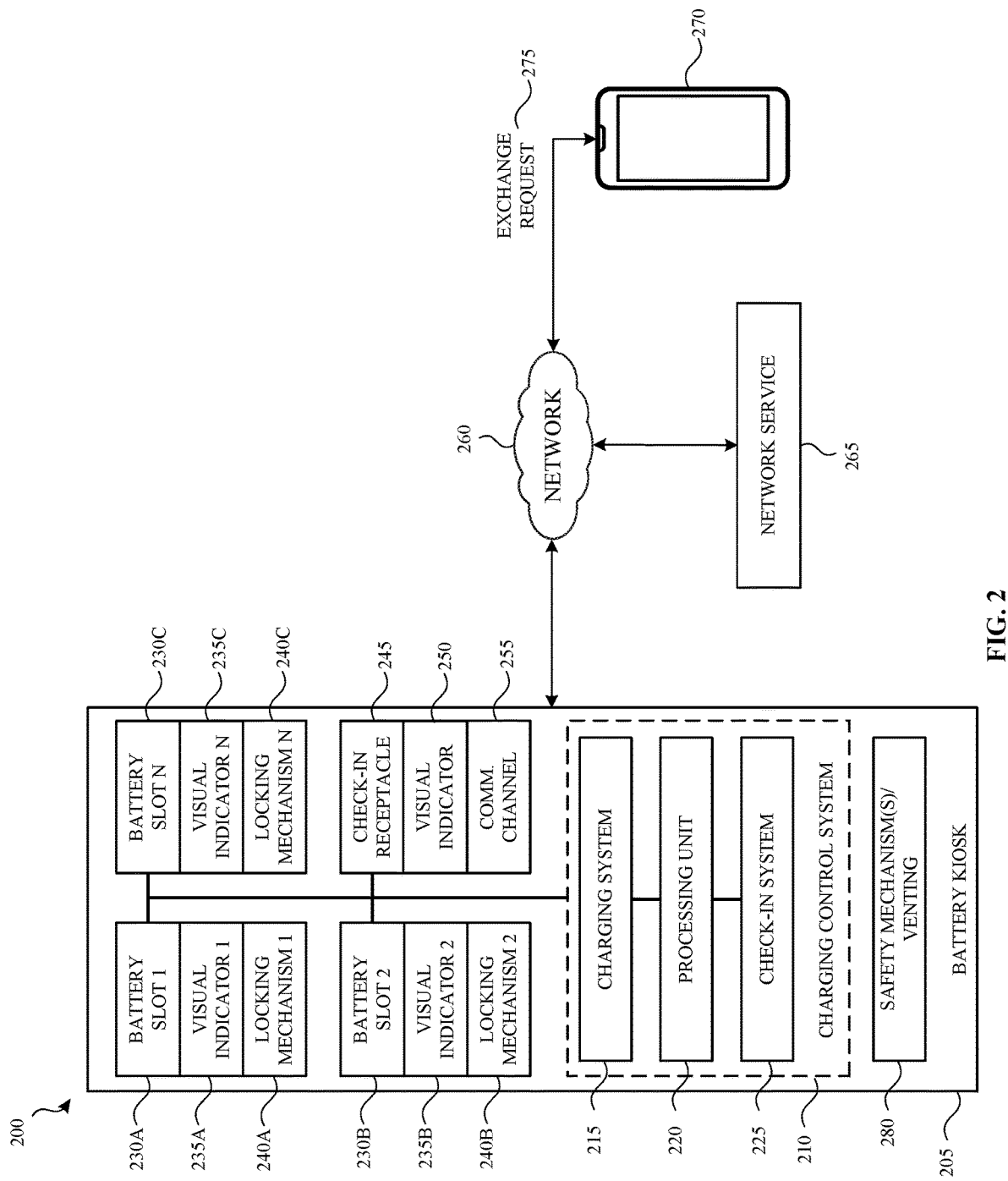
FIG. 2 is a system diagram of a rechargeable battery kiosk according to one or more examples.

FIG. 2 illustrates a rechargeable battery system 200 according to an example. The rechargeable battery system 200 includes a battery kiosk 205. In some examples, the battery kiosk 205 may be equivalent to the rechargeable battery kiosk 150 shown and described with respect to FIG. 1.

The battery kiosk 205 includes a charging control system 210 that determines and/or controls, among other things, a charging rate of each rechargeable battery in the battery kiosk 205, an amount of power/charge available in each rechargeable battery, which battery slots (e.g., battery slot 1 230A, battery slot 2 230B, battery slot N 230C) are available to receive a rechargeable battery during a rechargeable battery exchange process and/or which rechargeable battery the individual should take upon completion of the rechargeable battery exchange process.

For example, the charging control system 210 of the battery kiosk 205 includes a processing unit 220 that communicates, receives information from and/or sends instructions to a charging system 215. The charging system 215 controls a charging rate of each rechargeable battery in the battery kiosk 205. The charging system 215 may also store and/or communicate rechargeable battery status information (e.g., an amount of power remaining in the rechargeable battery, an anticipated amount of time until the rechargeable battery will be fully charged and/or charged above a charge threshold, how many times the rechargeable battery has been charged, whether the rechargeable battery is damaged etc.) to the charging control system 210. The rechargeable battery status information may also be sent (by the charging system 215 or the charging control system 210) over a network 260 to a network service 265. When the battery status information is received, the network service 265 may determine a charging rate for each rechargeable battery in the battery kiosk 205, determine which battery slot will receive a rechargeable battery during a rechargeable battery exchange process and/or which rechargeable battery should be taken by the individual.

The processing unit 220 of the charging control system 210 also communicates, receives information from and/or sends instructions to a check-in system 225. The check-in system 225 authenticates and/or verifies information about a rechargeable battery when an individual initiates a battery exchange process.

For example, an individual that rides, reserves and/or uses a light electric vehicle in a particular geographic area may be directed (e.g., by an application executing on the individual's computing device 270) to a battery kiosk 205 located in or otherwise associated with the geographic area when it is determined that the individual wishes, needs or should exchange the light electric vehicle's current rechargeable battery for a fully charged or substantially fully charged rechargeable battery.

In one example, as the individual is driving or riding the light electric vehicle, an application executing on the individual's computing device (e.g., computing device 270) may receive an indication from the light electric vehicle and/or the rechargeable battery that power in the rechargeable battery is getting low or is below a charge threshold (e.g., the battery has 20% of its power remaining). In another example, the light electric vehicle may include one or more lights, displays or other indicators that provide or otherwise display the amount of power remaining in the rechargeable battery. In yet another example, the rechargeable battery may include the indicators described above in order to display or otherwise communicate the amount of power remaining in the rechargeable battery to the individual.

When this information has been provided to the individual, in one example, the individual may wish to exchange the current rechargeable battery for one that is fully charged or substantially fully charged. Accordingly, the individual may access the application executing on the computing device 270 and initiate an exchange request 275. The exchange request 275 may include information about the current location of the individual. The exchange request 275 may also include information about the rechargeable battery (e.g., an amount of power remaining in the rechargeable battery, an identifier of the rechargeable battery, authentication credentials associated with the rechargeable battery, etc.). The exchange request 275 may be sent to the network service 265 over the network 260. The network service 265 may then direct the individual to a battery kiosk 205. For example, the application executing on the computing device 270 may communicate the location information of the individual to the network service 265. The network service 265 uses the location information, as well as location information of the battery kiosk 205, to direct (e.g., provide directions) the individual to the battery kiosk 205 that is capable of receiving, storing, and/or charging a rechargeable battery.

Although the example above explains that the individual is directed to a particular battery kiosk 205 when it is determined that the remaining power in the rechargeable battery is low or is below a threshold, the individual may simply decide to exchange the light electric vehicle's current rechargeable battery for one that is more fully charged—regardless of the amount of power remaining in the rechargeable battery. In such situations, the individual may be directed to, or may find, a battery kiosk 205 in order to initiate a check-in process and exchange their rechargeable battery.

When the individual reaches the location of the battery kiosk 205, the individual may remove the rechargeable battery from the light electric vehicle, and begin a rechargeable battery check-in process. To begin the rechargeable battery check-in process, the individual places the rechargeable battery into, near, or on a check-in receptacle 245 integrated with, coupled to, or otherwise associated with the battery kiosk 205. The check-in receptacle 245 uses a communication channel 255 (e.g., near field communication (NFC), Bluetooth, radio-frequency identification (RFID), network, etc.) to receive information about the rechargeable battery.

The information about the rechargeable battery may include an amount of power/charge remaining in the rechargeable battery, an identifier associated with the rechargeable battery, authentication credentials associated with the rechargeable battery, the number of times the rechargeable battery has been charged, overall health of the battery cells within the rechargeable battery and so on. The check-in system 225 can use this information to authenticate or otherwise verify that the rechargeable battery can and/or should be placed into one of the available rechargeable battery slots (e.g., battery slot 1 230A) in the battery kiosk 205. In other examples, the rechargeable battery information can be sent to a network service 265 over the network 260. The network service 265 can use the information to authenticate and/or verify the identity of the rechargeable battery.

The check-in receptacle 245 may include or otherwise be associated with a visual indicator 250. In some examples, the visual indicator 250 is a lighting device (e.g., a set of light emitting diodes, bulbs, screens, etc.) that indicates or otherwise notifies the individual where the rechargeable battery can and/or should be placed/inserted in order to begin the rechargeable battery check-in and exchange process. For example, the visual indicator 250 may illuminate at least a portion of the check-in receptacle 245, illuminate an area close to the check-in receptacle 245, and/or illuminate a border surrounding the check-in receptacle 245 prior to and/or during the check-in process. The visual indicator may be illuminated in a number of different colors and/or display different items of information to notify the individual where the check-in process can or should be initiated and/or the progress of the rechargeable battery check-in and exchange process.

In some examples, the visual indicator 250 can be triggered (e.g., turned on or off) in response to: 1) an individual approaching the battery kiosk 205; the individual bringing a rechargeable battery within a predetermined distance (e.g., five feet or less, ten feet or less, fifteen feet or less, etc.) of the battery kiosk 205; 3) when the battery kiosk 205 receives the exchange request 275 from the individual's computing device 270; and/or 4) when the battery kiosk 205 receives a signal or other indicator from the individual's computing device 270 and/or the network service 265 that is associated with the battery kiosk 205 that a battery exchange process has been initiated. In other examples, the visual indicator 250 of the battery kiosk 205 may include a low energy light that is always on.

During the check-in process, the visual indicator 250 may change colors in order to communicate information to the individual. For example, when the visual indicator 250 is a lighting device, the lighting device may emit a white light prior to the check-in process being initiated. When the rechargeable battery is being authenticated, the lighting device may emit a red light. When the rechargeable battery has been authenticated or otherwise verified, the lighting device may emit a green light.

When the rechargeable battery has been authenticated, the check-in system 225 may determine and indicate which battery slot in the battery kiosk 205 will receive the rechargeable battery. For example, the battery kiosk 205 may include a number of different rechargeable battery slots (shown in FIG. 2 as battery slot 1 230A, battery slot 2 230B, battery slot N 230C). Although three battery slots are shown, the battery kiosk 205 may have any number of battery slots.

In some examples, some of the battery slots may be occupied by rechargeable batteries while other battery slots may be empty. For example, battery slot 1 230A may be empty while battery slot 2 230B may contain a rechargeable battery that is fully charged or is in the process of being charged by the charging system 215.

Each rechargeable battery slot may also have an associated visual indicator (e.g., a lighting device(s)) and/or a locking mechanism that secures the rechargeable battery within the battery slot. For example, battery slot 1 230A may include visual indicator 1 235A and locking mechanism 1 240A, battery slot 2 230B may include visual indicator 2 235B and locking mechanism 2 240B and battery slot N 230C may include visual indicator N 235C and locking mechanism N 240C.

Once the rechargeable battery has been authenticated and/or identified (e.g., after the individual placed the rechargeable battery into and/or on the check-in receptacle 245), the battery kiosk 205 may activate or illuminate a visual indicator of one or more of the empty rechargeable battery slots signaling that the individual should insert the rechargeable battery into that particular battery slot. For example, once the authentication process is complete, the check-in system 225 and/or the processing unit 220 of the battery kiosk 205 may determine that battery slot 1 230A is empty and activate/illuminate visual indicator 1 235A.

In some examples, each visual indicator (e.g., visual indicator 1 235A, visual indicator 2 235B, and visual indicator N 235N) may emit a particular color of light depending on what is occurring during the check-in process. For example, when the battery kiosk 205 determines that battery slot 1 230A is empty and activates visual indicator 1 235A, the visual indicator 1 235A may emit a green light signaling that the individual should place the rechargeable battery into slot 1 230A. In another example, the visual indicator 1 235A may emit a red light when the battery kiosk 205 determines that the rechargeable battery has not been correctly inserted into the battery slot 1 230A.

Although the example above describes the identification of a single battery slot during the rechargeable battery check-in process, the battery kiosk 205 may have a number of different battery slots available. In such situations, each of the battery slots may be identified and/or illuminated by their associated visual indicators. For example, battery slot 1 230A may be illuminated by visual indicator 1 235A, battery slot 2 230B may be illuminated by visual indicator 2 235B etc.

In another example, even if the battery kiosk 205 has two or more battery slots available, the battery kiosk 205 may select only one of them and activate its associated visual indicator. For example, the battery kiosk 205 may determine that both battery slot 1 230A and battery slot 2 230B are both available to receive a rechargeable battery but may only activate visual indicator 1 235A. When this occurs, the battery kiosk 205 may unlock a locking mechanism associated with the identified battery slot (e.g., locking mechanism 240A) while keeping the locking mechanism (e.g., locking mechanism 2 240B) of the other available battery slot engaged. Keeping the locking mechanism of the other available battery slot engaged may prevent the individual from fully inserting the rechargeable battery into that battery slot.

When the individual inserts the rechargeable battery into the available rechargeable battery slot (e.g., battery slot 1 230A), the battery kiosk 205 determines whether the rechargeable battery was inserted correctly. For example, the battery kiosk 205 determines whether the rechargeable battery has been placed on and/or inserted into the rechargeable battery slot in an orientation, direction and/or distance required by the rechargeable battery slot (e.g., based on a shape, size and/or orientation of the rechargeable battery slot) to electrically couple the charging components and/or circuitry of the battery kiosk 205 to the charging components and/or circuitry of the rechargeable battery (e.g., the pins of the rechargeable battery slot align and contact the pins of the rechargeable battery).

If the rechargeable battery is not correctly inserted, the visual indicator (e.g., visual indicator 1 235A) associated with the rechargeable battery slot may provide a notification to the individual that the rechargeable battery was not inserted correctly (e.g., by changing a color of the visual indicator from green to red). If the rechargeable battery is correctly inserted into the battery slot, the visual indicator may be illuminated or activated accordingly (e.g., by flashing green, changing colors, etc.). In some examples, the battery kiosk 205 may use one or more sensors to determine whether the rechargeable battery was correctly inserted into the available battery slot. In another example, the battery kiosk 205 may determine whether the rechargeable battery was correctly inserted based on whether the pins of the rechargeable battery slot contact the pins of the rechargeable battery.

When the rechargeable battery is correctly inserted into the battery slot (e.g., battery slot 1 230A), the locking mechanism (e.g., locking mechanism 1 240A) associated with the battery slot may lock or otherwise secure the rechargeable battery within the battery slot. In some examples, the same locking mechanism that locks and releases the rechargeable battery may also be used to lock a door (and unlock the door or otherwise allow the door to be opened) that is associated with the battery slot. The processing unit 220 may then determine which rechargeable battery to give or otherwise make available to the individual.

In some examples, the processing unit 220 may identify a rechargeable battery with the most power/charge and illuminate the visual indicator associated with the battery slot that contains the identified battery. For example, if the processing unit 220 determines that the rechargeable battery in battery slot 2 230B has the most power (when compared with the other rechargeable batteries in the battery kiosk 205) or is fully charged, the processing unit 220 may illuminate visual indicator 2 235 B and simultaneously or substantially simultaneously unlock locking mechanism 2 240B.

In another example, the network service 265 may identify which rechargeable battery the individual should take and send instructions over the network 260 to the charging control system 210. The instructions cause the processing unit 220 of the charging control system 210 to activate/illuminate the visual indicator (e.g., visual indicator 2 235B) associated with the battery slot (e.g., battery slot 2 230B) of the identified battery. In addition, the battery kiosk 205 may unlock a locking mechanism (e.g., locking mechanism 2 240B) associated with the identified rechargeable battery to enable the individual to remove the identified rechargeable battery from the battery kiosk 205.

While examples herein describe visual indicators to guide the individual through the rechargeable battery exchange process, as an addition or an alternative, the battery kiosk 205 can include one or more display screens and/or one or more speakers to output visual instructions and/or audible instructions, respectively, in a sequential similar manner as the individual progresses from the check-in process to completion of the exchange.

In some examples, an individual may be required to complete the check-in process within a predetermined amount of time once the check-in process has been initiated. For example, once the rechargeable battery has been authenticated and/or identified, the individual may have thirty seconds to correctly insert the rechargeable battery into the identified/illuminated battery slot. If the individual fails to do so, the locking mechanism (e.g., locking mechanism 2 240B) of the identified battery (e.g., battery slot 2 230B) slot may reengage, thereby preventing the individual from correctly inserting the rechargeable battery in the battery slot. Additionally, the visual indicator (e.g., visual indicator 2 235B) associated with the battery slot and/or the visual indicator 250 associated with the check-in receptacle 245 may also be illuminated and/or activated indicating that the individual is required to initiate the check-in process again (e.g., by placing the rechargeable battery in/on the check-in receptacle 245 a second time). Additionally, when the rechargeable battery has been inserted into the identified battery slot, a second verification process may be initiated to ensure that the rechargeable battery that was placed on the check-in receptacle 245 is the same rechargeable battery that was inserted into the battery slot.

In some examples, the battery kiosk 205 stores a number of rechargeable batteries equal to the number of battery slots in the battery kiosk 205. In such examples, the individual may be required to remove an identified rechargeable battery and then place the old rechargeable battery into the now available battery slot. In other examples, the battery kiosk 205 houses fewer rechargeable batteries than the number of battery slots. For example, if the battery kiosk 205 includes ten battery slots, nine of the battery slots may have a rechargeable battery while one of the battery slots remains empty. Thus, when the individual initiates the rechargeable battery exchange process, the individual can insert the old/depleted rechargeable battery into the open battery slot and remove the identified rechargeable battery from a different battery slot.

The battery kiosk 205 may also includes various safety mechanism(s) and/or venting 280. The safety mechanism(s) and/or venting 280 may be arranged or otherwise configured to mitigate and prevent damage to the battery kiosk 205 and an individual should a rechargeable battery experience a failure event. For example, in the event of a thermal battery event, the venting 280 of the battery kiosk 205 may prevent propagation from one rechargeable battery to another. Additionally, the venting 280 or other safety mechanisms may direct any flames or gas up through the top and/or back of the battery kiosk 205 and away from an individual and other rechargeable batteries.

Figure 3:
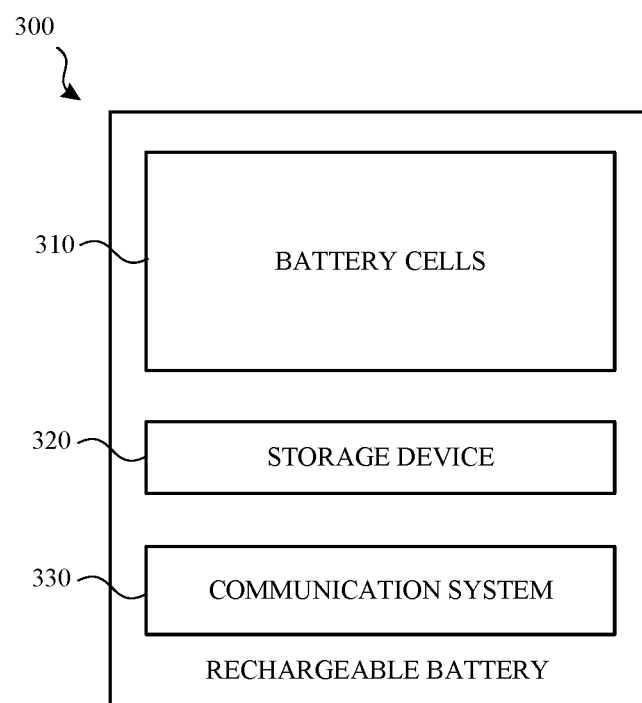
FIG. 3 is a system diagram of a rechargeable battery according to one or more examples.

FIG. 3 is a system diagram of a rechargeable battery 300 according to one or more examples. In some examples, the rechargeable battery 300 corresponds to the rechargeable battery 160 shown and described herein.

According to examples described, the rechargeable battery 300 includes a plurality of battery cells 310. The battery cells 310 are structured to receive power (and store charge) via a charging operation such as, for example, when the rechargeable battery is correctly inserted into a battery slot of a rechargeable battery kiosk (e.g., rechargeable battery kiosk 150 (FIG. 1)). The battery cells 310 of the rechargeable battery 300 are also configured to provide power (e.g., by discharging and providing current) to a light electric vehicle (e.g., the electric scooter 110 and/or the electric bicycle 130) (FIG. 1).

The rechargeable battery 300 may store, in a storage or memory device 320, charging status information and/or other information about the rechargeable battery 300 (e.g., battery identifier, model number, authentication credentials etc.). The charging status information may include information about an amount of available charge/power in the rechargeable battery 300 and/or an indication of the number of times the rechargeable battery 300 has been charged.

The rechargeable battery 300 may also include a communication system 330. In some examples, the communication system is a near field communication (NFC) system, a Bluetooth system, Wi-Fi system, a cellular communication system, and/or other such communication system that enables the rechargeable battery 300 to communicate or exchange data with another device (e.g., battery status information and/or identification information to a battery kiosk, to the network service, and/or to a computing device of an individual). In some examples, the communication system 330 transmits the rechargeable battery status information to a computing device (e.g., computing device 270) (FIG. 2). The computing device may then transmit this information to the battery kiosk and/or a network service as part of an exchange request (e.g., exchange request 275) (FIG. 2).

FIG. 4A-FIG. 4F illustrate how a battery kiosk 400 may be used to exchange a rechargeable battery according to one or more examples. The rechargeable battery 420 and/or the battery kiosk 400 may be similar to the rechargeable battery and rechargeable battery kiosks described herein.

In some examples, the battery kiosk 400 includes a check-in receptacle 430 that receives a rechargeable battery 420 from an individual 410. The check-in receptacle 430 may be positioned within the battery kiosk 400 at a number of different orientations. For example, the check-in receptacle 430 may be angled with respect to a surface (e.g., a sidewall or base) of the battery kiosk 430. In another example, the check-in receptacle 430 may be perpendicular to a sidewall of the battery kiosk 400. The check-in receptacle 430 may include a visual indicator 440 (e.g., a lighting device(s)). The visual indicator 440 may be activated when a rechargeable battery check-in process is initiated. For example, the visual indicator 440 may be activated when the individual initiates a rechargeable battery check-in process from an application executing on his computing device.

In another example, the visual indicator 440 may be activated when the individual 410 places the rechargeable battery 420 into or on the check-in receptacle 430. In another example, the visual indicator 440 may be activated when the individual 410 brings the rechargeable battery 420 within a predetermined distance of the battery kiosk 400 and/or check-in receptacle 430. For example, the battery kiosk 400 and rechargeable battery 420 may communicate with each other over a NFC channel when the rechargeable battery 420 is within a predetermined distance from the battery kiosk 400. In yet another example, the visual indicator 440 may include a low energy light that is always on. However, when the individual 410 approaches the battery kiosk 400 or otherwise initiates the rechargeable battery check-in process, the visual indicator 440 may transition from using the low energy light to a different light that emits more light and/or a different colored light.

The battery kiosk 400 may house or store other rechargeable batteries 460. These rechargeable batteries 460 may be fully charged or may be in the process of being charged by the battery kiosk 400. The battery kiosk 400 may also include a door 450 that may be opened when the individual 410 initiates the rechargeable battery check-in process and closed when the rechargeable battery exchange process is complete. In some examples, each battery slot 480 may be associated with a separate door 450. In other examples, a single door 450 may cover all of the battery slots 480 in the battery kiosk 400.

Figure 4B:
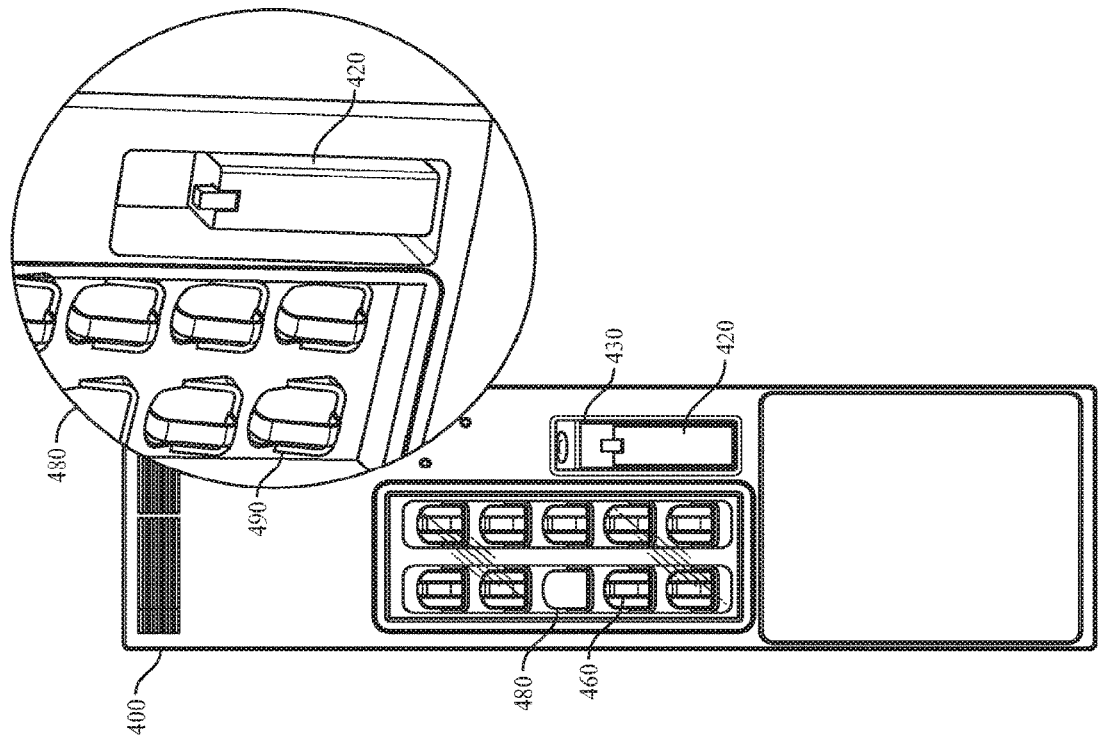
FIG. 4A-FIG. 4F illustrate how a battery kiosk receives and distributes rechargeable batteries in response to a received rechargeable battery exchange request according to one or more examples.

FIG. 4B illustrates that the battery kiosk 400 includes an available battery slot 480. For example, the battery kiosk 400 includes ten battery slots and houses nine rechargeable batteries 460. FIG. 4B also shows that each battery slot includes a visual indicator 490.

When the individual 410 initiates a rechargeable battery check-in process (e.g., by placing the rechargeable battery 420 into the check-in receptacle 430), the battery kiosk 400 receives (e.g., by the check-in system 225 (FIG. 2)) information about the rechargeable battery 420. In some examples, this information may be transmitted and/or received over a communication channel. In other examples, the battery kiosk 400 may use the information to verify that the rechargeable battery 420 can and/or should be received by the battery kiosk 400.

Figure 4A:
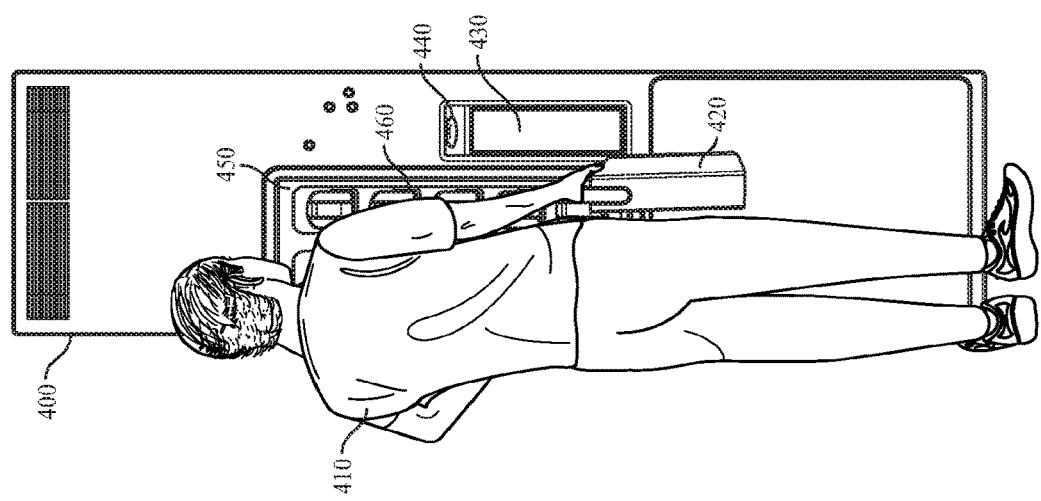
Figure 4D:
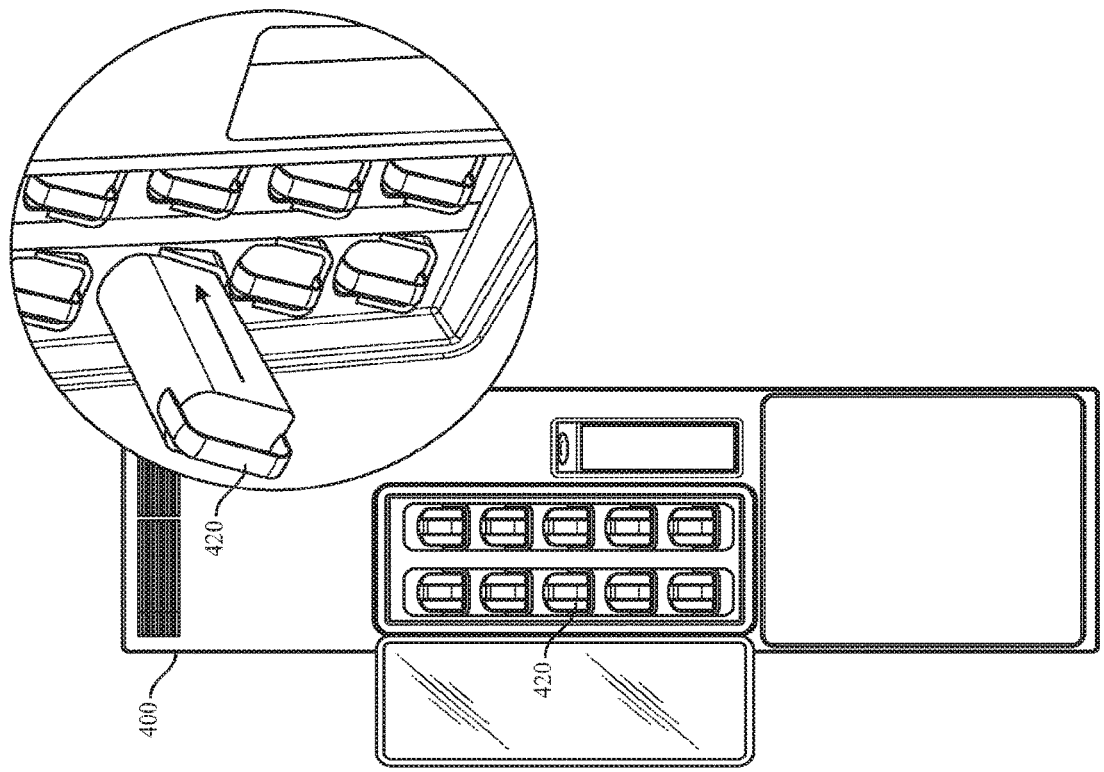
Figure 4C:
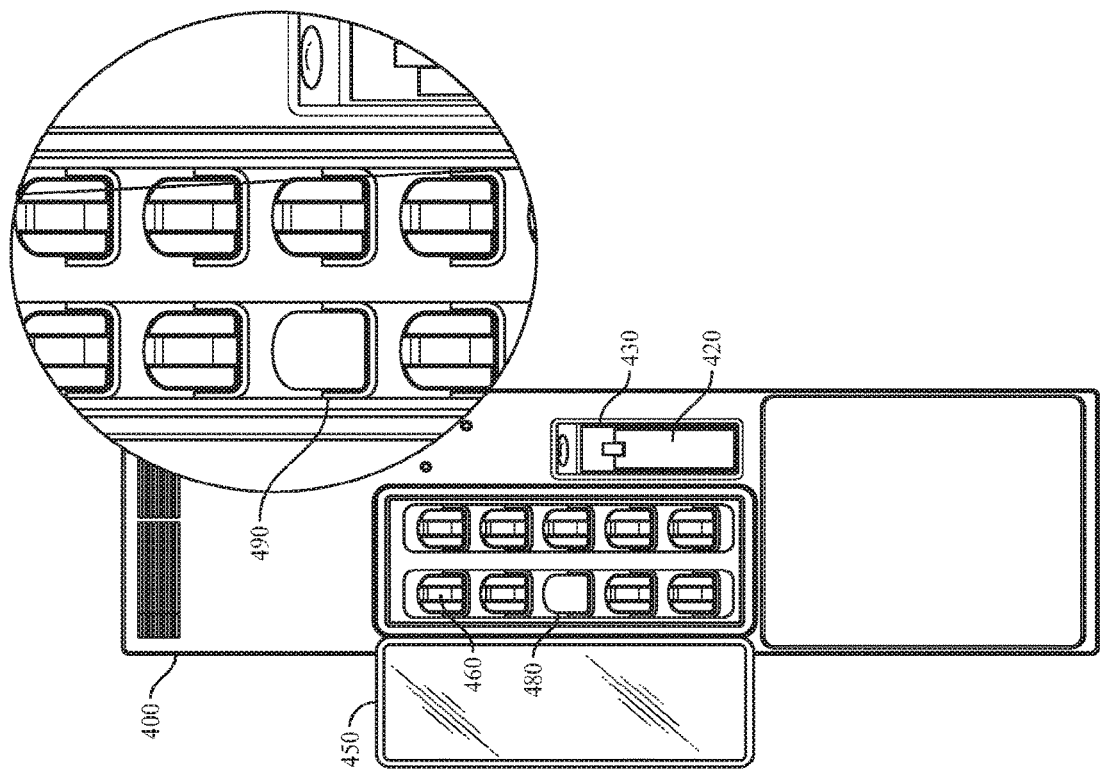

Turning to FIG. 4C, when the battery kiosk 400 verifies the identity or otherwise authenticates the rechargeable battery 420, a visual indicator 490 associated with the available battery slot 480 may be activated and/or illuminated. Activation of the visual indicator 490 notifies the individual that he should insert the rechargeable battery 420 into the available battery slot 480.

FIG. 4D illustrates that the rechargeable battery 420 has been removed from the check-in receptacle 430 and is being inserted (indicated by the directional arrow) into the available battery slot 480 of the battery kiosk 400.

When the battery kiosk 400 determines that the rechargeable battery 420 has been correctly inserted into the available battery slot 480, the battery kiosk 400 determines which rechargeable battery should be made available to the individual 410. For example and as shown in FIG. 4E, the battery kiosk 400 identifies a rechargeable battery 460 that the individual should remove from the battery kiosk 400 and illuminates or activates a visual indicator 490 associated with the identified rechargeable battery 460. The battery kiosk 400 also disengages a locking mechanism within the battery slot which enables the individual 410 to remove the rechargeable battery 460 from the battery kiosk 400 (shown by the directional arrow in FIG. 4E). The locking mechanism may also be used to lock/unlock a door (e.g., door 450) of the battery kiosk and/or the battery slot 480 that houses the rechargeable battery 460.

Figure 4F:
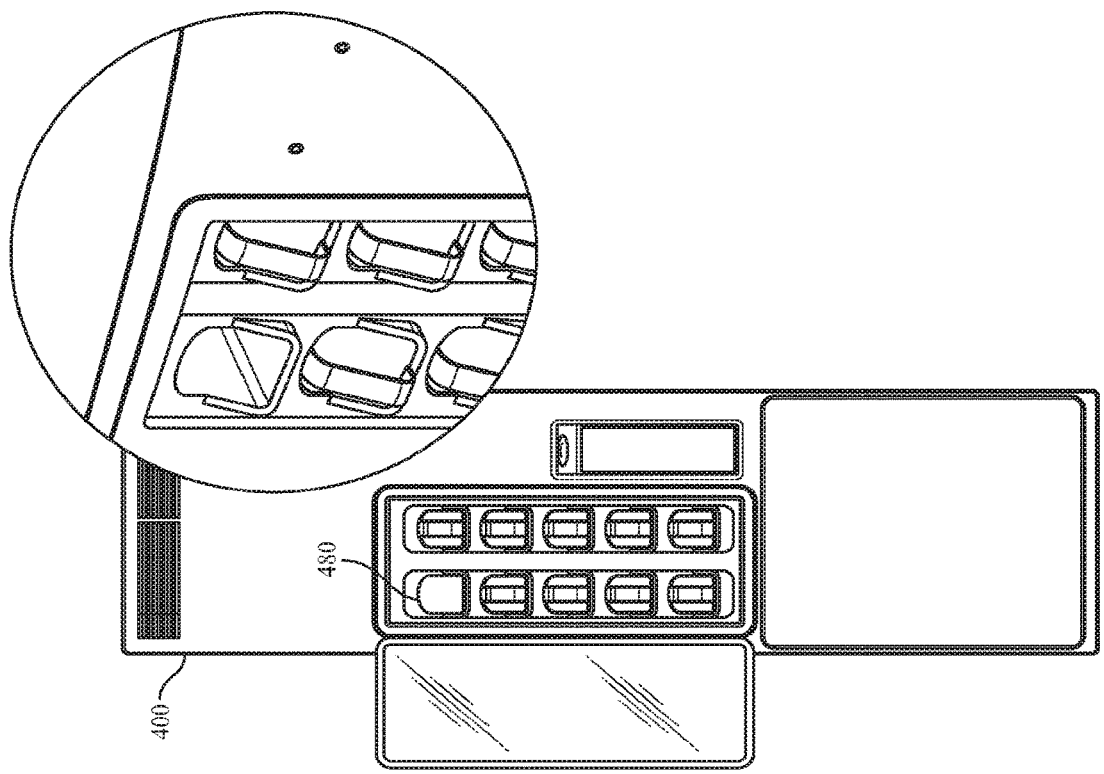
Figure 4E:
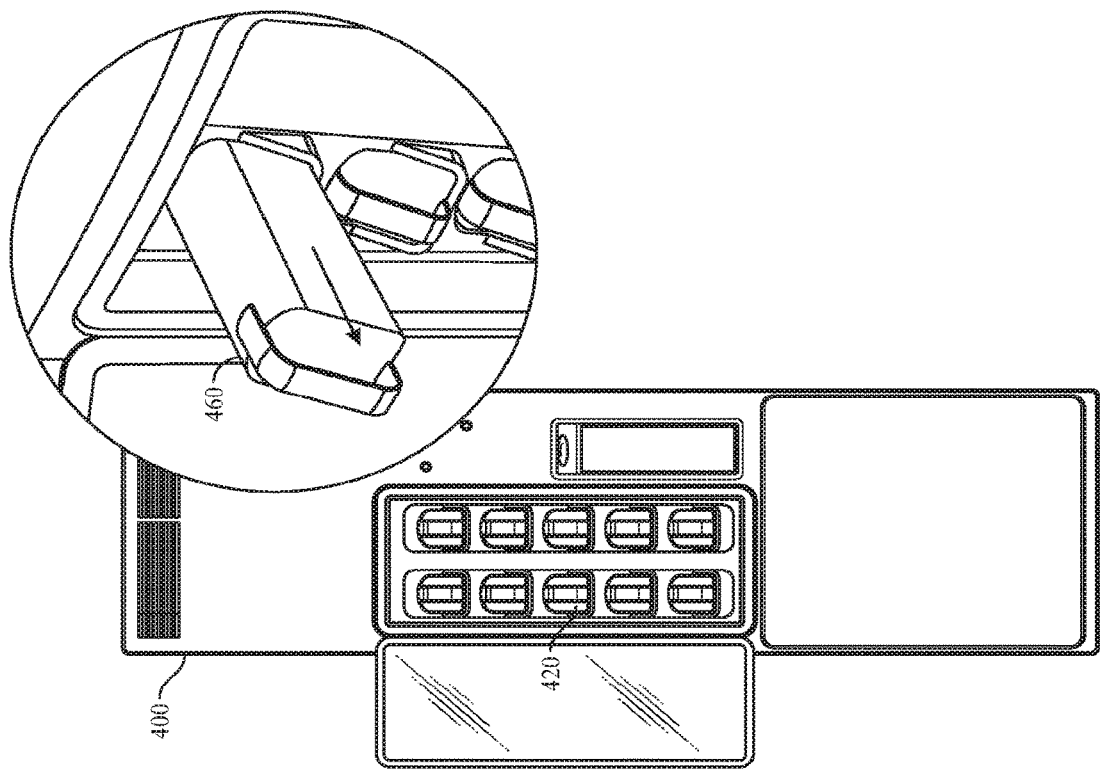

FIG. 4F illustrates the battery kiosk 400 at the end of the rechargeable battery exchange process. More specifically, FIG. 4F illustrates that the battery kiosk 400 has an available battery slot 480 as a result of the individual 410 removing the identified rechargeable battery 460.

Figure 5A:
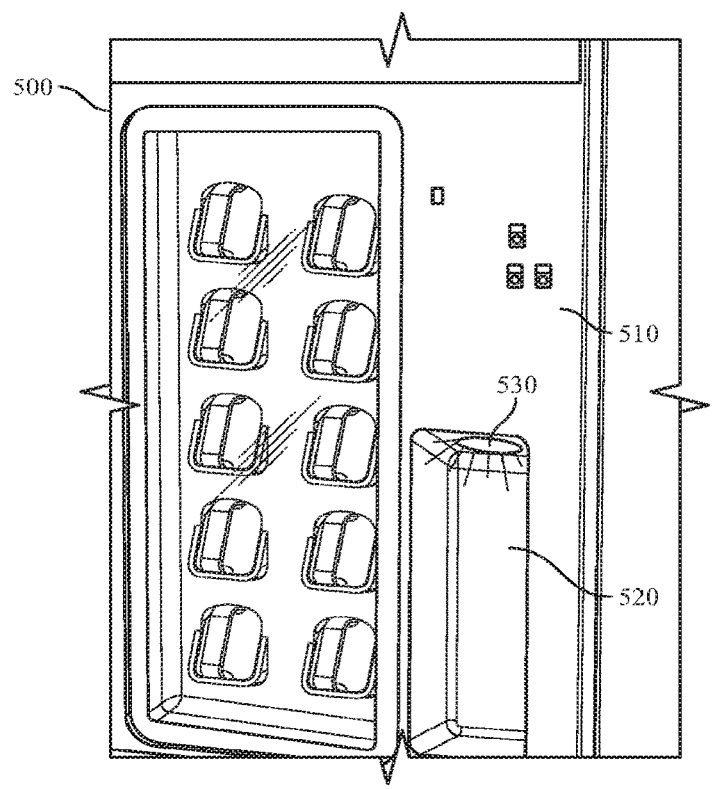
FIG. 5A-FIG. 5B illustrate different visual indicators for a rechargeable battery kiosk according to one or more examples.
Figure 5B:
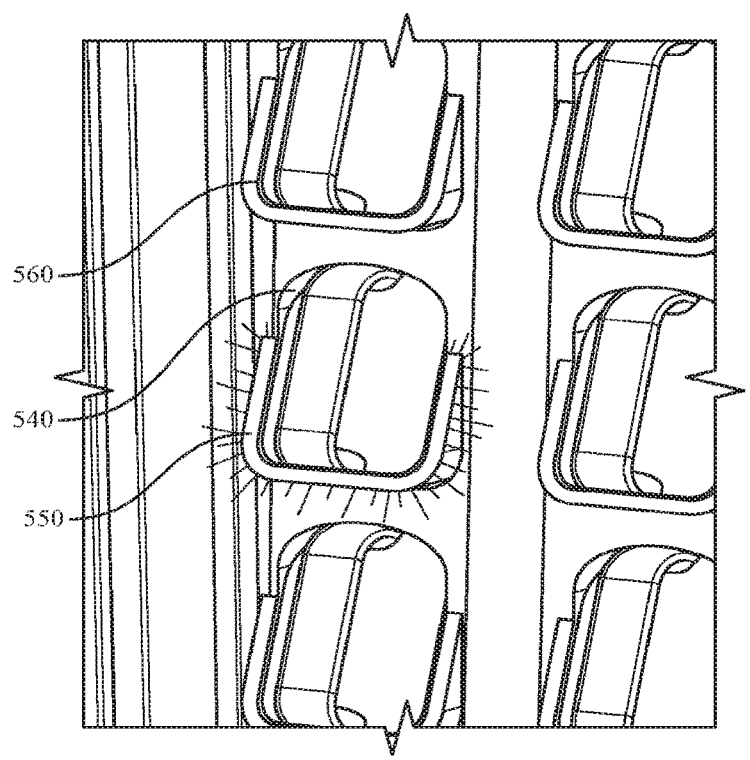

FIG. 5A-FIG. 5B illustrate different visual indicators of a rechargeable battery kiosk 500 according to one or more examples. The visual indicators may be similar to the other visual indicators described herein.

FIG. 5A illustrates a visual indicator 530 that is associated with a check-in receptacle 520 of a battery kiosk 500. Although the visual indicator 530 is shown as being integrated within the check-in receptacle 520, the visual indicator 530 may be placed on a border around the check-in receptacle 520, on the bottom of the check-in receptacle 520, and/or on one or more side walls of the check-in receptacle 520. The visual indicator 530 may have different lights, illumination patterns and/or colors based on a determination as to whether the rechargeable battery is communicatively coupled to the battery kiosk 500 and/or whether the rechargeable battery has been identified and/or authenticated by the battery kiosk 500.

The battery kiosk 500 may also include a display screen 510 and/or one or more speakers to output visual instructions and/or audible instructions, about a rechargeable battery exchange process such as described herein.

FIG. 5B illustrates a visual indicator 550 associated with a battery slot 560 of the battery kiosk 500. As discussed herein, the visual indicator 550 may be activated or illuminated to indicate that the individual should remove the rechargeable battery 540 from the battery slot 560 and/or indicate that the individual should insert the rechargeable battery 540 into the battery slot 560 that is illuminated by the visual indicator 550. The visual indicator 550 may have different lights, illumination patterns and/or colors based on a determination as to whether the rechargeable battery 540 has been correctly inserted into the battery slot 560.

Figure 6:
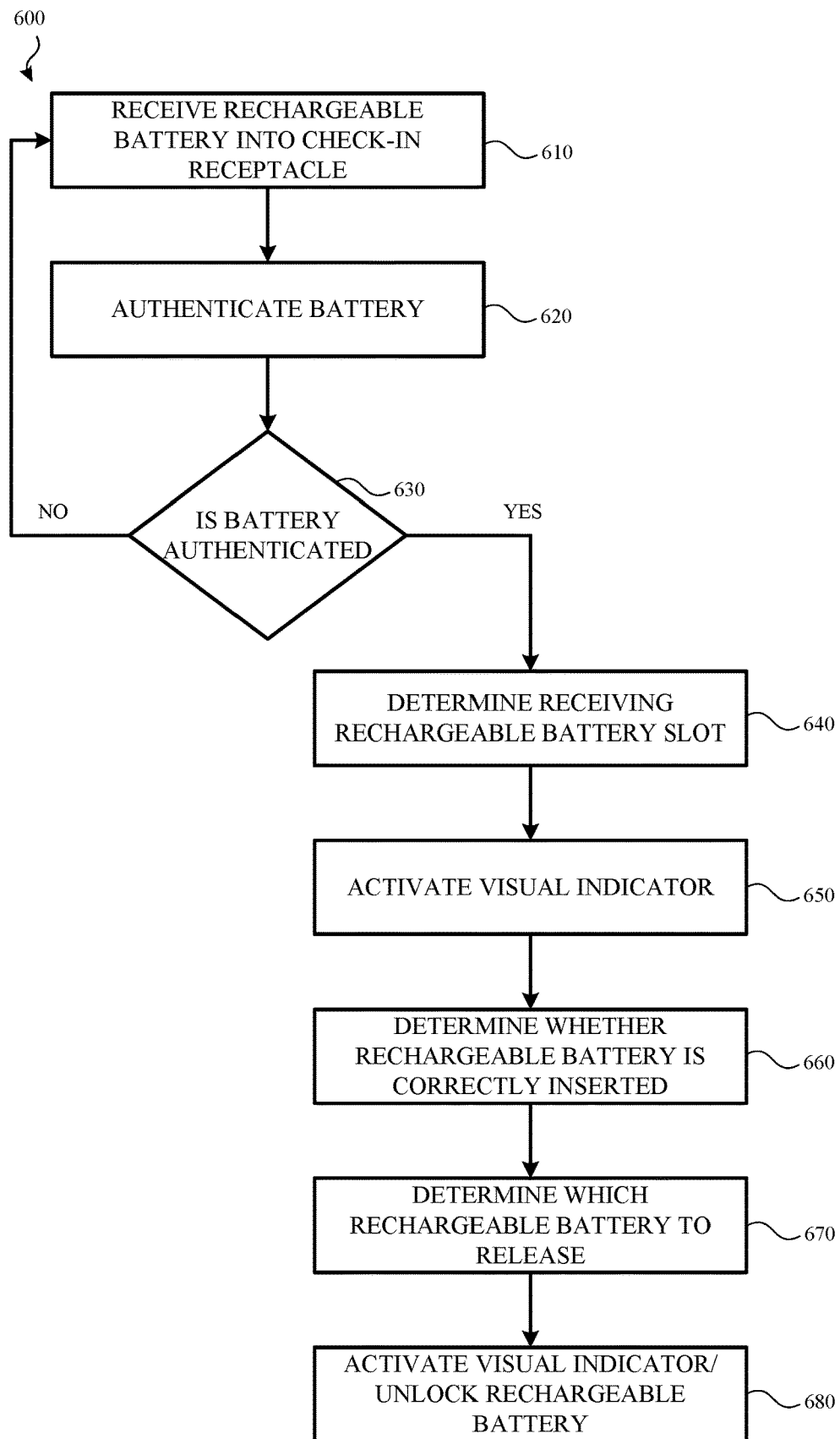
FIG. 6 illustrates a method for exchanging a rechargeable battery at a rechargeable battery kiosk according to one or more examples.

FIG. 6 illustrates a method 600 for exchanging a rechargeable battery at a rechargeable battery kiosk according to one or more examples. The method 600 may be performed by a battery kiosk such as, for example, battery kiosk 205 (FIG. 2) or battery kiosk 400 (FIG. 4A). The battery kiosk may perform method 600 in response to an individual initiating a rechargeable battery exchange request on an application executed by a computing device and/or when an individual approaches a battery kiosk such as described herein.

The method 600 begins when a rechargeable battery is received (610), placed onto or brought within a predetermined distance of a check-in receptacle of the battery kiosk. The check-in receptacle of the battery kiosk may be similar to check-in receptacle 430 (FIG. 4A). In some examples, the check-in receptacle may include or otherwise be associated with one or more visual indicators such as visual indicator 440 (FIG. 4A).

When the rechargeable battery has been received by the check-in receptacle, a check-in system of the battery kiosk authenticates (620) the rechargeable battery to ensure that the battery kiosk can and/or should accept and/or swap the rechargeable battery with a rechargeable battery housed by the battery kiosk. For example, the check-in system may receive rechargeable battery status information including, but not limited to, an identifier associated with the rechargeable battery, authentication credentials associated with the rechargeable battery, charge information of the rechargeable battery, and/or overall health of the battery cells within the rechargeable battery.

In some examples, check-in receptacle may include a visual indicator that provides status information, instructions or other information to the individual. For example, if battery kiosk authenticates (630) the rechargeable battery, the visual indicator may emit a green light. However, if the battery kiosk does not authenticate the rechargeable battery, the visual indicator may emit a red light indicating that the individual should place (610) the rechargeable battery in the check-in receptacle a second time and allow the battery kiosk to try and authenticate the rechargeable battery again.

When the rechargeable battery has been authenticated (630), the battery kiosk determines (640) an available battery slot that will receive the rechargeable battery. Once the available battery slot is determined, the battery kiosk activates (650) a visual indicator associated with the available battery slot. In some example, the battery slot and visual indicator may be similar to the battery slot 480 and the visual indicator 490 (FIG. 4B) and can be used to provide notice to the individual which battery slot should receive the rechargeable battery.

When the rechargeable battery has been inserted into the identified battery slot, the battery kiosk determines (660) whether the rechargeable battery has been correctly inserted into the battery slot. For example, the battery kiosk may determine whether the pins of the rechargeable battery slot align with and contact the pins of the rechargeable battery. In some examples, if the battery kiosk determines that the rechargeable battery has not been correctly inserted into the battery slot, the battery kiosk may cause the visual indicator to change colors such as described herein and/or provide other visual and/or audible instructions/directions.

When it is determined that the rechargeable battery was correctly inserted, the battery kiosk also determines (670) which rechargeable battery will be made available to the individual. In some examples, the determination is based, at least in part, on an amount of power in each rechargeable battery. For example, if one battery slot houses a rechargeable battery that is fully charged and another battery slot houses a rechargeable battery that is 50% charged, the battery kiosk may determine that the individual should take the rechargeable battery that is fully charged.

The battery kiosk then activates (680) a visual indicator associated with a battery slot that houses the identified rechargeable battery. The battery kiosk may also unlock a locking mechanism associated with the battery slot thereby enabling the individual to remove the rechargeable battery from the battery kiosk.

Figure 7:
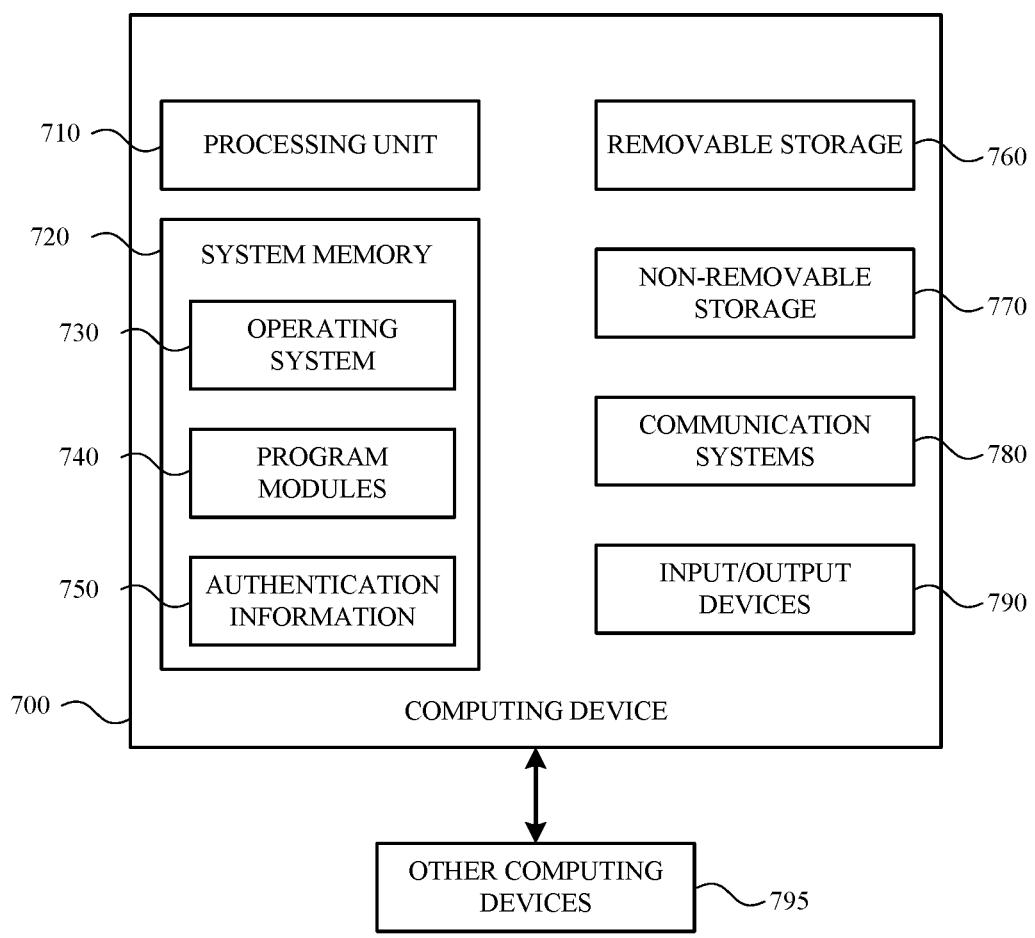
FIG. 7 is a system diagram of a computing device that may be integrated with or utilized by the rechargeable battery kiosk described herein.

FIG. 7 is a system diagram of a computing device 700 that may be integrated with or utilized by the rechargeable battery kiosk described herein. More specifically, FIG. 7 illustrates physical components (e.g., hardware) of a computing device 700 with which aspects of the disclosure may be practiced. The components of the computing device described below may be integrated with the battery kiosk 205 described herein.

The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that control the operation of the computing device 700 and one or more program modules 740. The program modules may be responsible for authenticating or otherwise verifying that the rechargeable battery can and/or should be received by the battery kiosk using authentication information 750.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

A number of different program modules and data files may be stored in the system memory 720. While executing on the processing unit 710, the program modules 740 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 700 may include one or more communication systems 780 that enable the computing device to communicate with rechargeable batteries, other computing devices 795, such as for example other battery kiosks, computing devices of individuals, a network service and the like. Examples of communication systems 780 include, but are not limited to, radio frequency (RF) transmitter, receiver, and/or transceiver circuitry; universal serial bus (USB), parallel, and/or serial ports.

The computing device 700 may also have one or more input devices and/or one or more output devices shown as input/output devices 790. These input/output devices 790 may include a keyboard, a trackpad, a mouse, a pen, a sound or voice input device, a touch, force and/or swipe input device, a display, speakers, a printer, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Examples of the present disclosure describe a method, comprising authenticating a first rechargeable battery at a battery kiosk and receiving the first rechargeable battery in an available battery slot of the battery kiosk. In response to receiving the first rechargeable battery in the available battery slot of the battery kiosk, unlocking a second rechargeable battery from a different battery slot in the battery kiosk and activating a visual indicator associated with the different battery slot, the visual indicator providing notification that the second rechargeable battery is removable from the different battery slot. In some examples, the method further comprises receiving, from the first rechargeable battery, information about the first rechargeable battery. In some examples, the information is used to authenticate the first rechargeable battery. In some examples, the information about the first rechargeable battery is received over a communication channel. In some examples, the communication channel corresponds to a near-field communication channel, a Bluetooth communication channel, a radio-frequency identification communication channel, or a wireless network communication channel. In some examples, the method further comprises activating a visual indicator associated with the available battery slot of the battery kiosk in response to authenticating the first rechargeable battery. In some examples, the method further comprises determining whether the first rechargeable battery has been correctly inserted into the available battery slot of the battery kiosk prior to unlocking the second rechargeable battery from the different battery slot in the battery kiosk. In some examples, unlocking the second rechargeable battery from the different battery slot in the battery kiosk and activating the visual indicator associated with the different battery slot is performed concurrently.

In other examples, a rechargeable battery kiosk is described. The rechargeable battery kiosk includes at least one processing unit and a memory coupled to the at least one processing unit. The memory stores instructions that, when executed by the at least one processing unit, perform operations, comprising: receiving identification information from a first rechargeable battery; verifying the identification information; receiving the first rechargeable battery in an available battery slot of the battery kiosk; and in response to receiving the first rechargeable battery in the available battery slot of the battery kiosk: unlocking a second rechargeable battery from a different battery slot in the battery kiosk when it is determined the first rechargeable battery is correctly inserted into the available battery slot; and activating a visual indicator associated with the different battery slot. In some examples, the visual indicator provides a notification that the second rechargeable battery is removable from the different battery slot. In some examples, the instructions include instructions for activating a visual indicator associated with the available battery slot when the identification information has been verified. In some examples, the instructions include instructions for engaging a locking mechanism associated with the available battery slot until the visual indicator associated with the available battery slot is activated. In some examples, the instructions include instructions for activating a locking mechanism associated with the available battery slot when it is determined that the first rechargeable battery is correctly inserted into the available battery slot. In some examples, the instructions include instructions for tracking an amount of time between when the identification information for the first rechargeable battery is received and when the first rechargeable battery is correctly inserted into the available battery slot.

Examples of the present disclosure also describe a method comprising receiving, at a rechargeable battery kiosk, identification information for a first rechargeable battery; receiving the first rechargeable battery in an available battery slot of the rechargeable battery kiosk; determining whether the rechargeable battery is correctly inserted into the available battery slot; and activating a visual indicator associated with a different battery slot, the visual indicator providing notification that a second rechargeable battery is removable from the different battery slot. In some examples, the method also includes unlocking the second rechargeable battery from the different battery slot in the battery kiosk when the visual indicator associated with the different battery slot is activated. In some examples, the method also includes unlocking the second rechargeable battery from the different battery slot in the battery kiosk when it is determined the rechargeable battery is correctly inserted in the available battery slot. In some examples, the identification information is used to authenticate the first rechargeable battery. In some examples, the identification information is received by the rechargeable battery kiosk over a communication channel. In some examples, the communication channel corresponds to: a near-field communication channel, a Bluetooth communication channel, a radio-frequency identification communication channel, or a wireless network communication channel.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A battery exchange method for a battery kiosk, comprising:
   activating a first visual indicator associated with a check-in receptacle, the first visual indicator providing guidance for placement of a first rechargeable battery at the battery kiosk;
   authenticating the first rechargeable battery;
   activating a second visual indicator associated with an available battery slot of the battery kiosk;
   receiving the first rechargeable battery in the available battery slot; and
   in response to receiving the first rechargeable battery in the available battery slot:
   unlocking a second rechargeable battery from a different battery slot in the battery kiosk; and
   activating a third visual indicator associated with the different battery slot, the visual indicator providing notification that the second rechargeable battery is removable from the different battery slot.

2. The method of claim 1, further comprising:
receiving, from the first rechargeable battery, information about the first rechargeable battery.

3. The method of claim 2, wherein the information is used to authenticate the first rechargeable battery.

4. The method of claim 2, wherein the information about the first rechargeable battery is received over a communication channel.

5. The method of claim 4, wherein the communication channel corresponds to:
a near-field communication channel;
a Bluetooth communication channel;
a radio-frequency identification communication channel; or
a wireless network communication channel.

6. The method of claim 1, further comprising:
determining whether the first rechargeable battery has been correctly inserted into the available battery slot of the battery kiosk prior to unlocking the second rechargeable battery from the different battery slot in the battery kiosk.

7. The method of claim 1, further comprising:
initiating the battery exchange via a computing device remote from the battery kiosk.

8. The method of claim 1, wherein the activation of the first visual indicator is triggered by:
detection of a user approaching the battery kiosk;
detection of a non-authenticated rechargeable battery within a predetermined distance of the battery kiosk;
initiation of the battery exchange via a computing device remote from the battery kiosk; or
receipt of a signal from a user computing device of network service associated with the battery kiosk.

9. The method of claim 8, wherein the predetermined distance is one of:
15 feet or less;
10 feet or less; and
5 feet or less.

10. The method of claim 1, wherein upon receipt of the first rechargeable battery in the available battery slot, verifying that the battery is identical to the authenticated battery.

11. The method of claim 1, further comprising:
tracking an amount of time between when the first rechargeable battery is authenticated and when the first rechargeable battery is correctly inserted into the available battery slot.

12. The method of claim 11, wherein when the amount of time between when the first rechargeable battery is authenticated and when the first rechargeable battery is correctly inserted into the available battery slot is greater than a predetermined limit, requiring re-authentication of the first rechargeable battery, and
wherein the re-authentication causes the second visual indicator to be deactivated and the first visual indicator activated.

13. A rechargeable battery kiosk for battery exchange, comprising:
at least one processing unit; and
a memory coupled to the at least one processing unit and storing instructions that, when executed by the at least one processing unit, perform a method, comprising:
activating a first visual indicator associated with a check-in receptacle, the first visual indicator providing guidance for placement of a first rechargeable battery at the battery kiosk;
receiving identification information from the first rechargeable battery;
verifying the identification information;
activating a second visual indicator associated with an available battery slot of the battery kiosk;
receiving the first rechargeable battery in the available battery slot; and
in response to receiving the first rechargeable battery in the available battery slot of the battery kiosk:
unlocking a second rechargeable battery from a different battery slot in the battery kiosk when it is determined the first rechargeable battery is correctly inserted into the available battery slot; and
activating a third visual indicator associated with the different battery slot.

14. The rechargeable battery kiosk of claim 13, wherein the third visual indicator provides a notification that the second rechargeable battery is removable from the different battery slot.

15. The rechargeable battery kiosk of claim 13, further comprising instructions for engaging a locking mechanism associated with the available battery slot until the second visual indicator associated with the available battery slot is activated.

16. The rechargeable battery kiosk of claim 13, further comprising instructions for activating a locking mechanism associated with the available battery slot when it is determined that the first rechargeable battery is correctly inserted into the available battery slot.

17. The rechargeable battery kiosk of claim 13, further comprising instructions for tracking an amount of time between when the identification information for the first rechargeable battery is received and when the first rechargeable battery is correctly inserted into the available battery slot.

18. The rechargeable battery kiosk of claim 13, further comprising instructions for receiving an initiation of the battery exchange via a computing device remote from the battery kiosk.

19. The rechargeable battery kiosk of claim 13, wherein the activation of the first visual indicator is triggered by:
detection of a user approaching the battery kiosk;
detection of a non-authenticated rechargeable battery within a predetermined distance of the battery kiosk;
initiation of the battery exchange via a computing device remote from the battery kiosk; or
receipt of a signal from a user computing device of network service associated with the battery kiosk.

20. The rechargeable battery kiosk of claim 13, wherein upon receipt of the first rechargeable battery in the available battery slot, verifying that the battery is identical to the verified battery.

* * * * *